US012558959B2

(12) United States Patent
Gichu

(10) Patent No.: US 12,558,959 B2
(45) Date of Patent: Feb. 24, 2026

(54) DRIVING ASSISTANCE DEVICE

(71) Applicant: TOYOTA JIDOSHA KABUSHIKI KAISHA, Toyota (JP)

(72) Inventor: Ryusei Gichu, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

(21) Appl. No.: 18/629,154

(22) Filed: Apr. 8, 2024

(65) Prior Publication Data

US 2024/0351438 A1 Oct. 24, 2024

(30) Foreign Application Priority Data

Apr. 19, 2023 (JP) ................................. 2023-068732

(51) Int. Cl.
*B60K 35/28* (2024.01)
*B60W 50/00* (2006.01)
*B60W 50/14* (2020.01)

(52) U.S. Cl.
CPC ............. *B60K 35/28* (2024.01); *B60W 50/14* (2013.01); *B60K 2360/119* (2024.01); *B60K 2360/195* (2024.01); *B60W 2050/0083* (2013.01); *B60W 2050/146* (2013.01); *B60W 2540/043* (2020.02); *B60W 2556/10* (2020.02)

(58) Field of Classification Search
CPC .............. B60K 35/28; B60K 2360/195; B60K 2360/119; B60W 50/14; B60W 2540/043; B60W 2556/10; B60W 2050/0083; B60W 2050/146
See application file for complete search history.

(56) References Cited

U.S. PATENT DOCUMENTS

| | | | | |
|---|---|---|---|---|
| 8,527,146 | B1 * | 9/2013 | Jackson ............ | B60W 50/0098 180/287 |
| 9,938,916 | B2 * | 4/2018 | Giovaresco .......... | G07C 5/0808 |
| 10,252,727 | B1 * | 4/2019 | Braun .................... | G06Q 40/08 |
| 2006/0282772 | A1 * | 12/2006 | Chamberlin .......... | G06F 3/0482 715/700 |
| 2010/0194552 | A1 * | 8/2010 | Jaisimha ................... | B60J 1/12 340/438 |
| 2017/0232914 | A1 * | 8/2017 | Brenner ................ | B60R 16/037 701/36 |
| 2017/0267241 | A1 | 9/2017 | Matsunaga et al. | |
| 2017/0305437 | A1 * | 10/2017 | Onorato ................. | G06Q 50/40 |

(Continued)

FOREIGN PATENT DOCUMENTS

| | | | | |
|---|---|---|---|---|
| CN | 104219281 | A | * 12/2014 | |
| CN | 109703562 | A | * 5/2019 | .......... B60W 50/082 |

(Continued)

*Primary Examiner* — Chico A Foxx

(74) *Attorney, Agent, or Firm* — Dinsmore & Shohl LLP

(57) ABSTRACT

There is provided a driving assistance device configured to assist driving of a vehicle, the driving assistance device being configured to store, in a storage unit, pieces of setting information regarding settings of a plurality of driving assistance functions mounted on the vehicle for each of a plurality of drivers, and acquire, when a driver of the vehicle is authenticated, the setting information corresponding to the authenticated driver from the storage unit, and display, on a display unit recognizable by the driver of the vehicle, an indication regarding the acquired setting information.

7 Claims, 3 Drawing Sheets

(56)　　　　References Cited

U.S. PATENT DOCUMENTS

| | | | | |
|---|---|---|---|---|
| 2017/0369010 | A1 * | 12/2017 | Tarte | B60W 50/14 |
| 2017/0369072 | A1 * | 12/2017 | Huber | B60W 30/09 |
| 2017/0369073 | A1 * | 12/2017 | Huber | B60W 50/00 |
| 2018/0040256 | A1 * | 2/2018 | Alvarez | G09B 9/05 |
| 2018/0196428 | A1 * | 7/2018 | Pilutti | B60W 30/18 |
| 2018/0204399 | A1 * | 7/2018 | Newman | G07C 9/28 |
| 2018/0208204 | A1 * | 7/2018 | Chen | G06F 1/1694 |
| 2018/0281777 | A1 * | 10/2018 | Khafagy | B60H 1/004 |
| 2018/0337870 | A1 * | 11/2018 | Schubert | H04L 51/02 |
| 2019/0072984 | A1 * | 3/2019 | Dougherty | G05D 1/101 |
| 2019/0135303 | A1 * | 5/2019 | Kim | G06N 20/00 |
| 2019/0179029 | A1 * | 6/2019 | Pacala | G01S 7/497 |
| 2019/0202477 | A1 * | 7/2019 | Kapuria | G06V 20/597 |
| 2020/0124851 | A1 * | 4/2020 | Higashiyama | G02B 27/0101 |
| 2020/0172112 | A1 * | 6/2020 | Kawashima | G06Q 30/0278 |
| 2020/0216079 | A1 * | 7/2020 | Mahajan | B60W 60/0051 |
| 2021/0039522 | A1 * | 2/2021 | Bove | B60N 2/0278 |
| 2021/0039663 | A1 * | 2/2021 | Gohlke | B60W 50/10 |
| 2021/0049250 | A1 | 2/2021 | Matsugi | |
| 2021/0295621 | A1 | 9/2021 | Kang et al. | |
| 2022/0048517 | A1 * | 2/2022 | Khayyer | B60K 35/28 |
| 2022/0219642 | A1 * | 7/2022 | Chen | H04L 67/306 |
| 2022/0291648 | A1 | 9/2022 | Sekino et al. | |

FOREIGN PATENT DOCUMENTS

| | | | | | |
|---|---|---|---|---|---|
| CN | 110015292 | A | * | 7/2019 | B60W 50/085 |
| CN | 118722470 | A | * | 10/2024 | B60R 16/037 |
| DE | 102016204901 | A1 | * | 9/2017 | B60W 50/14 |
| JP | H06-342302 | A | | 12/1994 | |
| JP | 2004-308587 | A | | 11/2004 | |
| JP | 2005-121563 | A | | 5/2005 | |
| JP | 2007-045168 | A | | 2/2007 | |
| JP | 2009-073421 | A | | 4/2009 | |
| JP | 2017-045128 | A | | 3/2017 | |
| JP | 2017-167758 | A | | 9/2017 | |
| JP | 2018-049477 | A | | 3/2018 | |
| JP | 2021-033309 | A | | 3/2021 | |
| JP | 2021-149928 | A | | 9/2021 | |
| JP | 2022-140011 | A | | 9/2022 | |
| KR | 20190023554 | A | * | 3/2019 | G06K 9/00845 |
| KR | 20220159647 | A | * | 12/2022 | B60W 40/08 |
| WO | WO-2020119989 | A1 | * | 6/2020 | B60R 16/037 |

* cited by examiner

*Fig.3*

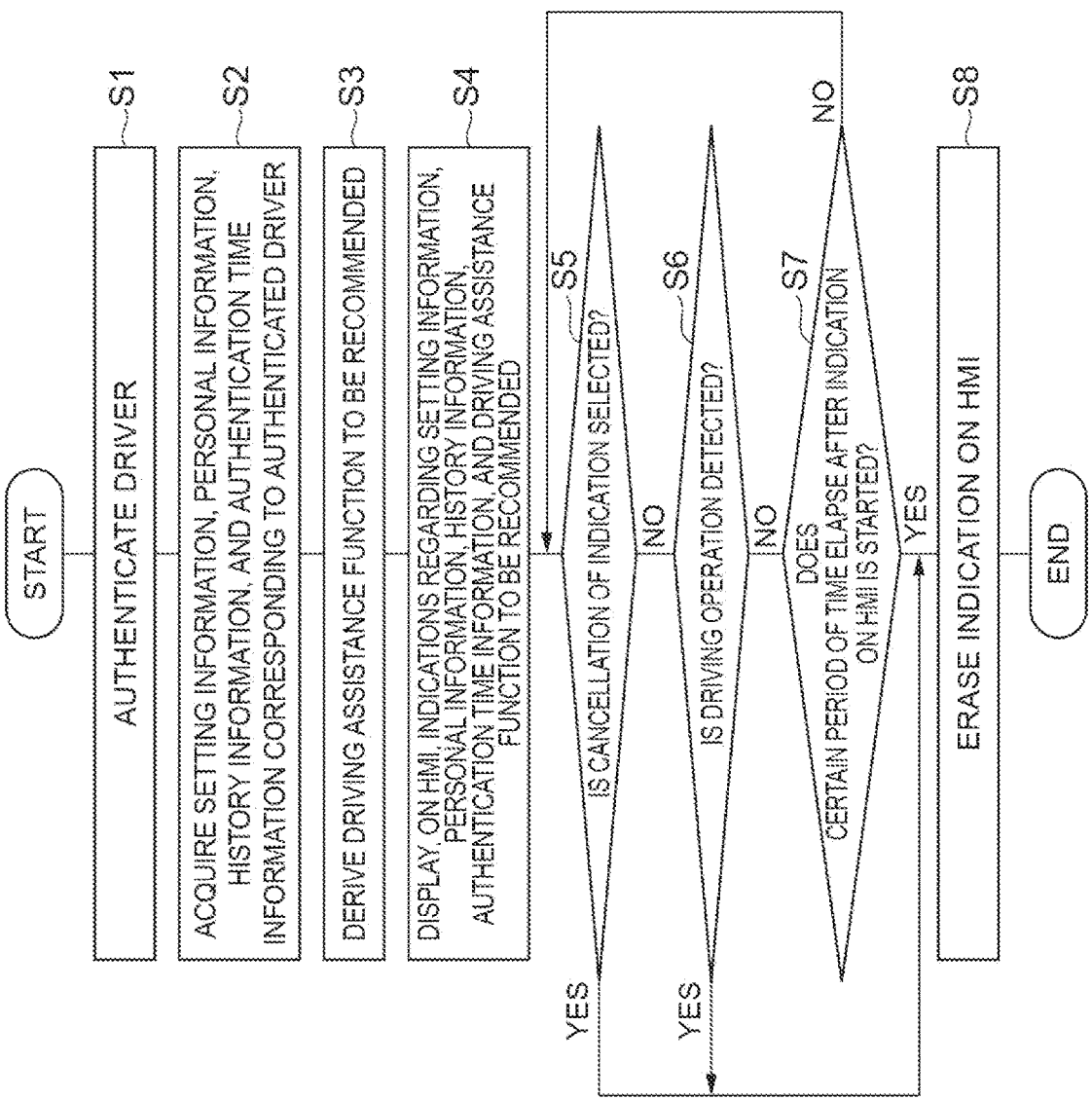

START

AUTHENTICATE DRIVER — S1

ACQUIRE SETTING INFORMATION, PERSONAL INFORMATION, HISTORY INFORMATION, AND AUTHENTICATION TIME INFORMATION CORRESPONDING TO AUTHENTICATED DRIVER — S2

DERIVE DRIVING ASSISTANCE FUNCTION TO BE RECOMMENDED — S3

DISPLAY, ON HMI, INDICATIONS REGARDING SETTING INFORMATION, PERSONAL INFORMATION, HISTORY INFORMATION, AUTHENTICATION TIME INFORMATION, AND DRIVING ASSISTANCE FUNCTION TO BE RECOMMENDED — S4

IS CANCELLATION OF INDICATION SELECTED? — S5
YES / NO

IS DRIVING OPERATION DETECTED? — S6
YES / NO

DOES CERTAIN PERIOD OF TIME ELAPSE AFTER INDICATION ON HMI IS STARTED? — S7
YES / NO

ERASE INDICATION ON HMI — S8

END

DRIVING ASSISTANCE DEVICE

CROSS-REFERENCE TO RELATED APPLICATIONS

This application is based upon and claims the benefit of priority from Japanese Patent Application No. 2023-068732, filed on Apr. 19, 2023, the entire contents of which are incorporated herein by reference.

TECHNICAL FIELD

The present disclosure relates to a driving assistance device.

BACKGROUND

An in-vehicle device control system described in Japanese Unexamined Patent Publication No. 2009-073421 is known as a technology related to a driving assistance device. The in-vehicle device control system described in Japanese Unexamined Patent Publication No. 2009-073421 specifies a driver, and sets, for each driver, a degree of driving intervention when collision or the like is predicted to occur.

SUMMARY

In the driving assistance device, pieces of setting information related to settings of a plurality of driving assistance functions mounted on a vehicle may be stored for each driver. In such a driving assistance device, when the driver drives the vehicle, the driver is authenticated, and the driving assistance function is activated based on the setting information corresponding to the driver. However, in this case, for example, since there is a possibility that the authentication of the driver fails and there is a possibility that the setting information is erroneously stored, there may be a situation in which a driving assistance function recognized as set by the driver is not actually set and does not work.

Therefore, an object of the present disclosure is to provide a driving assistance device capable of allowing a driver to drive a vehicle in a state of correctly recognizing a set driving assistance function.

A driving assistance device according to an aspect of the present disclosure is configured to store, in a storage unit, pieces of setting information regarding settings of a plurality of driving assistance functions mounted on a vehicle for each of a plurality of drivers, and acquire, when a driver of the vehicle is authenticated, the setting information corresponding to the authenticated driver from the storage unit and display, on a display unit recognizable by the driver of the vehicle, an indication regarding the acquired setting information.

In this driving assistance device, the driver can correctly recognize the set driving assistance function by viewing the indication regarding the setting information displayed on the display unit. That is, the driver can drive the vehicle in a state of correctly recognizing the set driving assistance function.

In the driving assistance device according to the aspect of the present disclosure, the indication regarding the setting information may be temporarily displayed on the display unit. In this case, it is possible to suppress the indication regarding the setting information from disturbing the driving.

In the driving assistance device according to the aspect of the present disclosure, the indication regarding the setting information may include an icon indicating a setting of on or off of at least a part of the plurality of driving assistance functions. In this case, it is possible to easily recognize the settings of on or off the plurality of driving assistance functions.

In the driving assistance device according to the aspect of the present disclosure, the indication regarding the setting information may include an icon indicating a setting of on or off of at least a collision prevention function. In this case, it is possible to easily recognize the setting of on or off of the collision prevention function which is one of the particularly important driving assistance functions.

In the driving assistance device according to the aspect of the present disclosure, the indication displayed on the display unit may be erased based on a driving operation by the driver of the vehicle. In this case, it is possible to erase the indication on the display unit not to disturb the driving operation by the driver.

In the driving assistance device according to the aspect of the present disclosure, the authentication of the driver is started when an ignition switch or a power switch of the vehicle is turned on. In this case, the ignition switch or the power switch is turned on, and thus, the driver is authenticated, and the indication regarding the setting information is displayed on the display unit. Accordingly, the driver can start the driving of the vehicle in a state of correctly recognizing the set driving assistance function.

The driving assistance device according to the aspect of the present disclosure may be configured to store pieces of personal information of the plurality of drivers in the storage unit, and acquire, when the driver of the vehicle is authenticated, the personal information corresponding to the authenticated driver from the storage unit, and display, on the display unit, an indication regarding the acquired personal information together with the indication regarding the setting information. In this case, it is possible to check whether the driver is correctly authenticated.

The driving assistance device according to the aspect of the present disclosure may be configured to store pieces of history information regarding past driving histories of the drivers in the storage unit, and acquire, when the driver of the vehicle is authenticated, the history information corresponding to the authenticated driver from the storage unit, and display, on the display unit, an indication regarding the acquired history information together with the indication regarding the setting information. In this case, it is possible to grasp the recognized intention of the setting of the driving assistance function from the past driving history.

According to the aspect of the present disclosure, it is possible to provide the driving assistance device capable of allowing the driver to drive the vehicle in a state of correctly recognizing the set driving assistance function.

BRIEF DESCRIPTION OF THE DRAWINGS

FIG. 3 is a flowchart showing an example of processing of the driving assistance device of FIG. 1.

DETAILED DESCRIPTION

Hereinafter, exemplary embodiments will be described with reference to the drawings. In the following description, the same or corresponding elements are denoted by the same reference signs, and redundant description will not be repeated.

Figure 1:
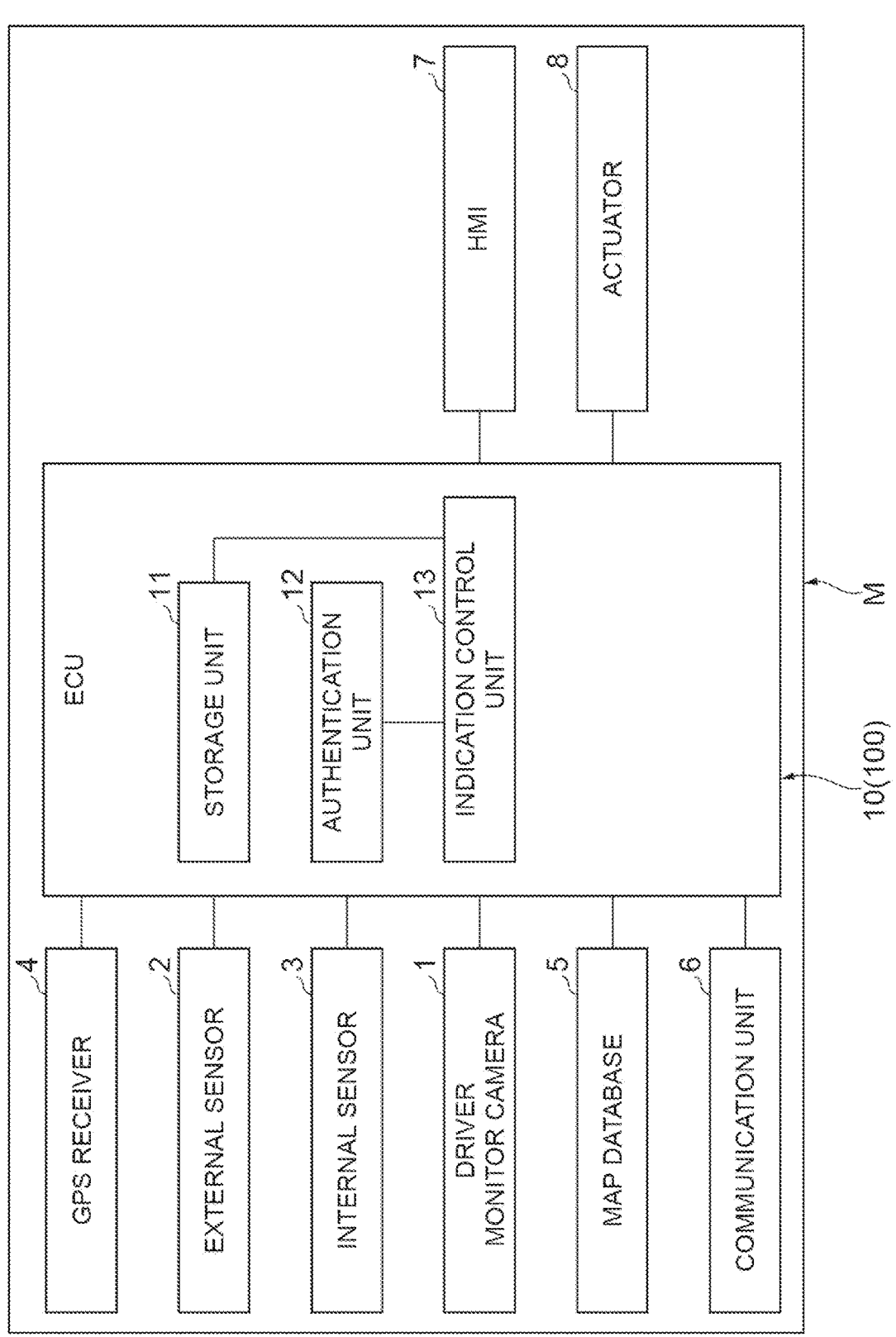
FIG. 1 is a block diagram showing a configuration of a vehicle on which a driving assistance device according to an embodiment is mounted.

FIG. 1 is a block diagram showing a configuration of a vehicle M on which a driving assistance device 100 according to an embodiment is mounted. As shown in FIG. 1, the driving assistance device 100 is a device that is mounted on the vehicle M such as a passenger car and assists driving of the vehicle M. When the vehicle M is an automated vehicle, the driving assistance device 100 may be a device capable of implementing automated driving, or may be a device capable of executing only driving assistance of a driver of the vehicle M.

The driving assistance device 100 includes electronic control unit (ECU) 10 that comprehensively manages a system. The ECU 10 is an electronic control unit including a central processing unit (CPU), a read only memory (ROM), and a random access memory (RAM). The ECU 10 implements various functions by, for example, loading a program stored in the ROM into the RAM and executing the program loaded in the RAM by the CPU. A part of the functions of the ECU 10 may be executed in a server that can communicate with the vehicle M. The ECU 10 may include a plurality of electronic units. The ECU 10 is connected to a driver monitor camera 1, an external sensor 2, an internal sensor 3, a global positioning system (GPS) receiver 4, a map database 5, a communication unit 6, an HMI 7, and an actuator 8.

The driver monitor camera 1 is provided at a position in front of the driver of the vehicle M (hereinafter, also simply referred to as a "driver") on a cover of a steering column of the vehicle M. The driver monitor camera 1 images a head of the driver. A plurality of driver monitor cameras 1 may be provided to image the driver from a plurality of directions. The driver monitor camera 1 transmits, to the ECU 10, a driver image obtained by imaging the driver.

The external sensor 2 is a detection device that detects a surrounding environment of the vehicle M. The external sensor 2 includes a camera and a radar sensor. The camera is provided, for example, on a back side of a windshield of the vehicle M and images the front of the vehicle M. The camera may be provided on a back surface and a side surface of the vehicle M. The camera transmits imaging information around the vehicle M to the ECU 10. The camera may be a monocular camera or a stereo camera. The radar sensor is a detection device that detects an obstacle around the vehicle M by using radio waves (for example, millimeter waves) or light. The radar sensor includes, for example, a millimeter wave radar or a lidar. The radar sensor transmits the detected obstacle information to the ECU 10.

The internal sensor 3 is a detection device that detects a traveling state of the vehicle M. The internal sensor 3 includes a vehicle speed sensor, an acceleration sensor, and a yaw rate sensor. The vehicle speed sensor is a detector that detects a speed of the vehicle M. For example, a wheel speed sensor that detects a rotation speed of a wheel is used as the vehicle speed sensor. The vehicle speed sensor transmits the detected vehicle speed information to the ECU 10. The acceleration sensor is a detector that detects an acceleration of the vehicle M. The acceleration sensor transmits, for example, acceleration information of the vehicle M to the ECU 10. The yaw rate sensor is a detector that detects a yaw rate (rotation angular velocity) around a vertical axis of a center of gravity of the vehicle M. For example, a gyro sensor can be used as the yaw rate sensor. The yaw rate sensor transmits the detected yaw rate information of the vehicle M to the ECU 10.

The internal sensor 3 may include at least one of a steering sensor, an accelerator sensor, a brake sensor, and a blinker sensor. The steering sensor detects a steering operation of the driver. The steering sensor transmits the detected steering operation information to the ECU 10. The accelerator sensor detects an accelerator operation of the driver. The accelerator sensor transmits the detected accelerator operation information to the ECU 10. The brake sensor detects a brake operation of the driver. The brake sensor transmits the detected brake operation information to the ECU 10. The blinker sensor detects an operation of a blinker (direction indicator lamp) of the driver. The blinker sensor transmits the detected blinker operation information to the ECU 10.

The GPS receiver 4 measures a position of the vehicle M (for example, latitude and longitude of the vehicle M) by receiving signals from three or more GPS satellites. The GPS receiver 4 transmits the measured positional information of the vehicle M to the ECU 10. Note that, the driving assistance device 100 may acquire the positional information of the vehicle M by a simultaneous localization and mapping (SLAM) technology using the detection result of the external sensor 2 and map information.

The map database 5 is a database that stores map information. The map database 5 is provided, for example, in a hard disk drive (HDD) mounted on the vehicle M. The map information includes positional information of a road, information of a road shape information (for example, a curve, a type of a straight portion, a curvature of a curve, and the like), width information of the road, height information of the road, pieces of information of intersection, junction, and branch point, positional information of a building, and the like. The map information may include positional information related to an installation object on the road such as a guide plate or a sign. Note that, the map database 5 may be stored in a computer of a facility such as a management center that can communicate with the vehicle M.

The communication unit 6 is a communication device that controls wireless communication with an outside of the vehicle M. The communication unit 6 communicates various types of information with a server via, for example, a communication network. The communication unit 6 may perform vehicle-to-vehicle communication. The communication unit 6 is not particularly limited, and various known communication devices can be used.

The HMI 7 is an interface for inputting and outputting information to and from the driver. The HMI 7 includes, for example, a display (display unit) and a speaker that can be visually recognized by the driver. The HMI 7 outputs an image from the display and outputs a sound from the speaker in response to a control signal from the ECU 10. The HMI 7 may include a head up display (HUD).

The actuator 8 is a device used for controlling the vehicle M. The actuator 8 includes at least a drive actuator, a brake actuator, and a steering actuator. The drive actuator controls an engine and/or a motor as a power source in response to a control signal from the ECU 10, and controls a driving force of the vehicle M. The brake actuator controls a brake system in response to a control signal from the ECU 10 to control a braking force to be applied to wheels of the vehicle M. The steering actuator controls driving of an assist motor that controls a steering torque in an electric power steering system in response to a control signal from the ECU 10. Accordingly, the steering actuator controls a torque of the vehicle M.

A plurality of driving assistance functions are mounted on the vehicle M. The driving assistance function is a function of assisting the driving of the vehicle M. The driving assistance function is not particularly limited, and may be various assistance functions. The driving assistance function is implemented by appropriately controlling the actuator 8 and other in-vehicle devices by the ECU 10 based on, for example, an input of at least one of the external sensor 2, the internal sensor 3, the GPS receiver 4, the map database 5, and the communication unit 6. A method for implementing the driving assistance function is not particularly limited, and any known technology can be used.

The plurality of driving assistance functions may include, for example, a collision prevention function for preventing collision of the vehicle M. Examples of the collision prevention function include an advanced emergency braking system (AEBS) that assists braking when there is a possibility of collision. The plurality of driving assistance functions may include, for example, lane tracing assist (LTA) that warns a possibility of departure from a lane and assists steering to avoid departure.

The plurality of driving assistance functions may include, for example, adaptive cruise control (ACC) that detects a state of a preceding vehicle and assists maintenance of an inter-vehicle distance. The plurality of driving assistance functions may include, for example, a lane departure alert (LDA) for calling attention by a buzzer and a display indication when there is a possibility that the vehicle M will depart from the lane without performing a blinker operation. The plurality of driving assistance functions may include, for example, an automatic high beam that detects brightness in front of the vehicle M and automatically switches between a high beam and a low beam.

The ECU 10 includes a storage unit 11, an authentication unit 12, and an indication control unit 13. The storage unit 11 stores pieces of setting information regarding current settings of the plurality of driving assistance functions for each of the plurality of drivers. The plurality of driving assistance functions can be set via, for example, the HMI 7. The setting information is information of a setting value regarding whether the driver is currently set to on (valid) or off (invalid) for each of the plurality of driving assistance functions. The setting information is information regarding a customized setting in which the driver customizes on or off of each driving assistance function. The setting information is information regarding a setting of on or off of at least the collision prevention function. The storage unit 11 stores pieces of personal information of a plurality of drivers. The personal information may include a name or an ID (identifier) of the driver. The personal information can be set via, for example, the HMI 7.

The storage unit 11 stores pieces of history information regarding past driving histories for each of the plurality of drivers. The history information includes information regarding a travel distance of the driver in previous driving and information regarding a destination of the driver in the previous driving. The travel distance in the previous driving is, for example, a travel distance traveled from when an ignition switch or a power switch of the vehicle M is turned on to when the ignition switch or the power switch is turned off in the previous driving. The destination in the previous driving is, for example, a destination set via the HMI 7 in the previous driving, or a position of the vehicle M measured by the GPS receiver 4 when the ignition switch or the power switch is turned off in the previous driving. The history information may include information regarding other driving histories.

The authentication unit 12 detects a face feature from the driver image imaged by the driver monitor camera 1, and authenticates the driver based on the detection result. A method for authenticating the driver is not particularly limited, and various methods can be applied. The authentication unit 12 starts authentication of the driver when the ignition switch or the power switch of the vehicle M is turned on. Note that, the authentication unit 12 may be provided not in the vehicle M but on a cloud capable of communicating with by the communication unit 6. The authentication unit 12 stores, in the storage unit 11, authentication time information regarding a date and time when the driver is authenticated.

When the authentication unit 12 authenticates the driver, the indication control unit 13 acquires setting information corresponding to the authenticated driver from the storage unit 11. The indication control unit 13 temporarily displays an indication regarding the setting information of the driver on the display of the HMI 7. The indication control unit 13 displays the indication regarding the setting information of the driver on the display of the HMI 7 for a predetermined constant time (for example, 6 seconds).

Figure 2:
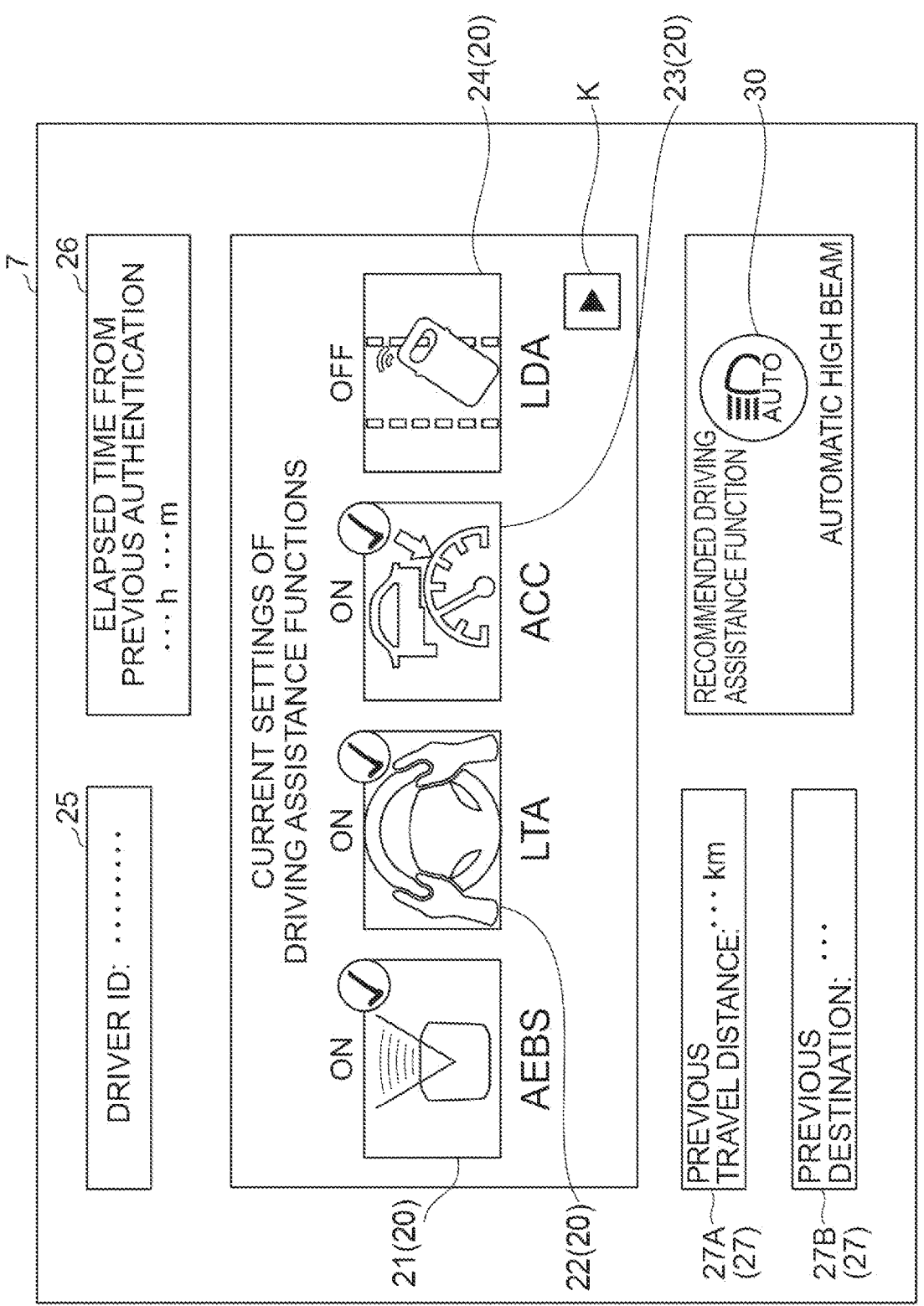
FIG. 2 is a diagram showing an indication example of an HMI of FIG. 1 on a display.

As shown in FIG. 2, the indication temporarily displayed on the HMI 7 includes a plurality of icons 20 indicating settings of on or off of the plurality of currently set driving assistance functions. The icon 20 includes an indication of a name or abbreviation of the driving assistance function corresponding to the icon 20. The icon 20 indicates the driving assistance function by, for example, at least one of a character, a figure, a symbol, color, and the like. When the driving assistance function is turned on, the icon 20 includes a check mark. When the driving assistance function is turned off, the icon 20 does not include a check mark. When the driving assistance function is turned on, the icon 20 includes an indication of ON. When the driving assistance function is turned off, the icon 20 includes an indication of OFF. Pieces of information of the plurality of icons 20 are stored in association with the driving assistance functions in the storage unit 11.

For example, when it is determined that the current setting of the driver is on from the setting information for a certain driving assistance function, the indication control unit 13 temporarily displays the icon 20 corresponding to the driving assistance function, including the check mark, and including the indication of ON on the HMI 7. For example, when it is determined that the current setting of the driver is off from the setting information for a certain driving assistance function, the indication control unit 13 temporarily displays the icon 20 corresponding to the driving assistance function and including the indication of OFF without including the check mark on the HMI 7.

The plurality of icons 20 temporarily displayed on the HMI 7 include an icon 21 regarding a setting of on or off of at least collision damage reduction braking. In the shown example, the plurality of icons 20 temporarily displayed on the HMI 7 further include an icon 22 regarding a setting of on or off of the lane tracing assist, an icon 23 regarding a setting of on or off of the adaptive cruise control, and an icon 24 regarding the setting of on or off of the lane departure alert. Note that, a part or all of the plurality of icons 21 to 24 temporarily displayed on the HMI 7 may be switched to another icon 20 by selecting a switching button K. The other icon 20 indicates a driving assistance function different from the driving assistance functions of the icons 21 to 24.

When the authentication unit 12 authenticates the driver, the indication control unit 13 acquires personal information corresponding to the authenticated driver from the storage unit 11. The indication control unit 13 temporarily displays, on the HMI 7, an indication 25 regarding the personal information of the authenticated driver together with the icon 20. When the authentication unit 12 authenticates the driver, the indication control unit 13 acquires, from the storage unit 11, authentication time information regarding a date and time in previous authentication of the driver. The indication control unit 13 temporarily displays, on the HMI 7, an indication 26 regarding an elapsed time from the previous authentication of the driver to current authentication of the driver together with the icon 20.

When the authentication unit 12 authenticates the driver, the indication control unit 13 acquires the history information corresponding to the authenticated driver from the storage unit 11. The indication control unit 13 temporarily displays, on the HMI 7, an indication 27 regarding the history information of the authenticated driver together with the icon 20. The indication 27 regarding the history information includes an indication 27A regarding a previous travel distance and an indication 27B regarding a previous destination.

The indication control unit 13 derives a driving assistance function to be recommended to the authenticated driver. For example, the indication control unit 13 may derive the driving assistance function to be recommended by a known method based on the history information or the like of the authenticated driver. The indication control unit 13 temporarily displays, on the HMI 7, an icon 30 regarding the driving assistance function to be recommended together with the icon 20. A name or abbreviation of the driving assistance function corresponding to the icon 30 is displayed around the icon 30. In the shown example, the driving assistance function to be recommended is an automatic high beam.

The indication control unit 13 erases the indication temporarily displayed on the HMI 7 based on an operation by the driver. Specifically, when cancellation of the indication is selected via the HMI 7 (when a cancel button on the HMI 7 is touched), the indication control unit 13 erases the indication temporarily displayed on the HMI 7. When a driving operation of the driver is detected, the indication control unit 13 deletes the indication temporarily displayed on the HMI 7. The driving operation includes an accelerator operation by the driver, a steering operation by the driver, a brake operation by the driver, an operation of a steering switch by the driver, and other operations by the driver. The driving operation of the driver can be detected by, for example, the internal sensor 3. The ECU 10 sets operations of the plurality of driving assistance functions based on the setting information corresponding to the driver authenticated by the authentication unit 12.

Next, an example of processing of the driving assistance device 100 will be described with reference to a flowchart of FIG. 3.

When the driver monitor camera 1 starts to image the driver from a timing at which the driver gets in the vehicle M and the ignition switch or the power switch of the vehicle M is turned on, the authentication unit 12 authenticates the driver based on the imaging result of the driver monitor camera 1 (step S1). The indication control unit 13 calls and acquires the setting information, the personal information, the history information, and the authentication time information of the authenticated driver from the storage unit 11 (step S2).

Subsequently, the indication control unit 13 derives the driving assistance function to be recommended to the authenticated driver (step S3). The indication control unit 13 displays, on the HMI 7, the indications regarding the setting information regarding the current setting of the driving assistance function, the personal information of the driver, the history information of the driver, the authentication time information of the driver, and the driving assistance function to be recommended to the driver (see FIG. 2: step S4). In step S4 described above, for example, "currently set values are as follows" may be output as voice from the speaker of the HMI 7.

Subsequently, the indication control unit 13 determines whether or not cancellation of the indication displayed on the HMI 7 is selected in step S4 (step S5). When NO is in step S5, the indication control unit 13 determines whether or not the driving operation by the driver is detected (step S6). When NO is in step S6, it is determined whether or not a certain period of time elapses after indication on the HMI 7 is started (step S7). When NO is in step S7, the processing returns to step S5. On the other hand, when YES is in step S5, when NO is in step S6, or when YES is in step S7, the indication control unit 13 erases the indication of the HMI 7 and ends the processing (step S8).

As described above, in the driving assistance device 100, the driver can recognize the set driving assistance function by looking at the indication regarding the setting information displayed on the HMI 7. That is, the driver can drive the vehicle M in a state of correctly recognizing the set driving assistance function.

The driving assistance device 100 temporarily displays the indication regarding the setting information on the HMI 7. In this case, as compared with a case where the indication regarding the setting information is continuously displayed on the HMI 7, it is possible to suppress interference of the indication regarding the setting information with the driving.

In the driving assistance device 100, the indication regarding the setting information includes the icon 20 indicating the setting of on or off of at least a part of the plurality of driving assistance functions. In this case, it is possible to easily recognize the settings of on or off the plurality of driving assistance functions.

In the driving assistance device 100, the indication regarding the setting information includes the icon 21 indicating the setting of on or off of at least the collision prevention function. In this case, it is possible to easily recognize the setting of on or off of the collision prevention function which is one of the particularly important driving assistance functions.

The driving assistance device 100 erases the indication displayed on the HMI 7 based on the operation by the driver of the vehicle M. In this case, the indication of the HMI 7 can be erased not to interfere with the operation by the driver.

The driving assistance device 100 starts the authentication of the driver when the ignition switch or the power switch of the vehicle M is turned on. In this case, the driver is authenticated by turning on the ignition switch or the power switch, and the indication regarding the setting information is displayed on the HMI 7. Accordingly, the driver can start the driving of the vehicle M in a state of correctly recognizing the set driving assistance function.

The driving assistance device 100 stores the pieces of personal information of the plurality of drivers in the storage unit 11. When the driver of the vehicle M is authenticated, the personal information corresponding to the authenticated driver is acquired from the storage unit 11. The indication regarding the acquired personal information is displayed together with the indication regarding the setting information on the HMI 7. In this case, it is possible to check whether the driver is correctly authenticated.

The driving assistance device 100 stores the pieces of history information regarding the past driving histories of the drivers in the storage unit 11. When the driver is authenticated, the history information corresponding to the authenticated driver is acquired from the storage unit 11, and the indication regarding the acquired history information is displayed together with the indication regarding the setting information on the HMI 7. In this case, it is possible to grasp the recognized intention of the setting of the driving assistance function from the past driving history. For example, it is possible to recognize that the past driving history is long distance traveling, and in this case, it is possible to recall that the current settings of some driving assistance functions are turned on because of the long distance traveling.

Although the embodiment has been described above, one aspect of the present disclosure is not limited to the above-described embodiment. The aspect of the present disclosure can be performed in various forms with various modifications and improvements based on knowledge of those skilled in the art, including the above-described embodiment.

In the above embodiment, the icon 20 indicating the setting of on or off of the driving assistance function is displayed as the indication regarding the setting information on the HMI 7, but the indication regarding the setting information is not particularly limited. The setting of the driving assistance function may be displayed on the HMI 7 by using a graph and a table. Only the driving assistance function set to on may be displayed on the HMI 7. Only the driving assistance function set to off may be displayed on the HMI 7. The setting is not limited to the setting of on or off of the driving assistance function, and other settings may be displayed on the HMI 7.

In the above embodiment, the indication 25 regarding the personal information may not be provided. In the above embodiment, the indication 26 regarding the elapsed time in the HMI 7 may be omitted. In the above embodiment, the indication 27 regarding the history information in the HMI 7 may not be provided. In the above embodiment, there may be no indication of the icon 30 of the driving assistance function to be recommended in the HMI 7.

In the above embodiment, the driver is authenticated by using the driver monitor camera 1, but the present disclosure is not limited thereto. For example, the driver may be authenticated by using a known device such as a device that detects biological information or the like of the driver. In the above embodiment, the indication regarding the setting information is temporarily displayed on the HMI 7, but whether or not the indication is temporary is not particularly limited.

In the above embodiment, the authentication of the driver is started at the timing when the ignition switch or the power switch is turned on, but the present disclosure is not limited thereto. The authentication of the driver may be started, for example, when an authentication start switch is selected by the driver, or may be started when opening or closing of a door of a driver's seat is detected. In addition, the authentication of the driver may be periodically performed.

In the above embodiment, the storage unit 11 may be present outside the vehicle M (for example, an external server). In this case, it is easy to use the vehicle M as a share car. In the above embodiment, in each piece of processing of the driving assistance device 100, information acquired by at least one of vehicle-to-vehicle communication and road-to-vehicle communication may be used.

In the above embodiment, the driving assistance function mounted on the vehicle M may be another advanced driver-assistance systems (ADAS) function. For example, the driving assistance function may be lane keeping control radar cruise control, congestion assistance, lane change assistance, overtaking assistance, a preceding vehicle start alarm, a parking support brake, advanced parking, intelligent parking assist, and road sign assist.

Note that, constituent elements of one aspect of the present disclosure will be described below.

<Disclosure 1>

A driving assistance device configured to assist driving of a vehicle, the driving assistance device being configured to:

store, in a storage unit, pieces of setting information regarding settings of a plurality of driving assistance functions mounted on the vehicle for each of a plurality of drivers; and acquire, when a driver of the vehicle is authenticated, the setting information corresponding to the authenticated driver from the storage unit, and display, on a display unit recognizable by the driver of the vehicle, an indication regarding the acquired setting information.

<Disclosure 2>

The driving assistance device according to Disclosure 1, in which the indication regarding the setting information is temporarily displayed on the display unit.

<Disclosure 3>

The driving assistance device according to Disclosure 1 or 2, in which the indication regarding the setting information includes an icon indicating a setting of on or off of at least a part of the plurality of driving assistance functions.

<Disclosure 4>

The driving assistance device according to any one of Disclosures 1 to 3, in which the indication regarding the setting information includes an icon indicating a setting of on or off of at least a collision prevention function.

<Disclosure 5>

The driving assistance device according to any one of Disclosures 1 to 4, in which the indication displayed on the display unit is erased based on a driving operation by the driver of the vehicle.

<Disclosure 6>

The driving assistance device according to any one of Disclosures 1 to 5, in which the authentication of the driver is started when an ignition switch or a power switch of the vehicle is turned on.

<Disclosure 7>

The driving assistance device according to any one of Disclosures 1 to 6, in which the driving assistance device is configured to:

store pieces of personal information of the plurality of drivers in the storage unit; and acquire, when the driver of the vehicle is authenticated, the personal information corresponding to the authenticated driver from the storage unit, and display, on the display unit, an indication regarding the acquired personal information together with the indication regarding the setting information.

<Disclosure 8>

The driving assistance device according to any one of Disclosures 1 to 7, in which the driving assistance device is configured to:

store pieces of history information regarding past driving histories of the drivers in the storage unit; and acquire, when the driver of the vehicle is authenticated, the history information corresponding to the authenticated driver from the storage unit, and display, on the display unit, an indication regarding the acquired history information together with the indication regarding the setting information.

What is claimed is:

1. A driving assistance device configured to assist driving of a vehicle, the driving assistance device being configured to:

store, in a storage unit, pieces of setting information regarding settings of a plurality of driving assistance functions mounted on the vehicle for each of a plurality of drivers; and acquire, when a driver of the vehicle is authenticated, the setting information corresponding to the authenticated driver from the storage unit, and display, on a display unit recognizable by the driver of the vehicle, an indication regarding the acquired setting information, wherein the indication regarding the setting information includes an icon indicating a setting of on or off of at least a part of the plurality of driving assistance functions such that when the driving assistance function is turned on, the icon includes a check mark and when the driving assistance function is turned off, the icon does not include the check mark or when the driving assistance function is turned on, the icon includes an indication of ON and when the driving assistance function is turned off, the icon includes the indication of OFF.

2. The driving assistance device according to claim 1, wherein the indication regarding the setting information is temporarily displayed on the display unit.

3. The driving assistance device according to claim 1, wherein the indication regarding the setting information includes an icon indicating a setting of on or off of at least a collision prevention function.

4. The driving assistance device according to claim 1, wherein the indication displayed on the display unit is erased based on a driving operation by the driver of the vehicle.

5. The driving assistance device according to claim 1, wherein the authentication of the driver is started when an ignition switch or a power switch of the vehicle is turned on.

6. The driving assistance device according to claim 1, wherein the driving assistance device is configured to:

store pieces of personal information of the plurality of drivers in the storage unit; and acquire, when the driver of the vehicle is authenticated, the personal information corresponding to the authenticated driver from the storage unit, and display, on the display unit, an indication regarding the acquired personal information together with the indication regarding the setting information.

7. The driving assistance device according to claim 1, wherein the driving assistance device is configured to:

store pieces of history information regarding past driving histories of the drivers in the storage unit; and acquire, when the driver of the vehicle is authenticated, the history information corresponding to the authenticated driver from the storage unit, and display, on the display unit, an indication regarding the acquired history information together with the indication regarding the setting information.

* * * * *